United States Patent
Yoshitomo et al.

(10) Patent No.: US 8,530,773 B2
(45) Date of Patent: Sep. 10, 2013

(54) GAS INSULATED APPARATUS

(75) Inventors: Yuji Yoshitomo, Chiyoda-ku (JP); Toru Yamashita, Chiyoda-ku (JP); Toshie Takeuchi, Chiyoda-ku (JP); Makiko Kawada, Chiyoda-ku (JP); Takao Tsurimoto, Chiyoda-ku (JP); Shigeyuki Yamamoto, Chiyoda-ku (JP); Kazuki Kubo, Chiyoda-ku (JP); Takashi Miyamoto, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 216 days.

(21) Appl. No.: 13/201,057

(22) PCT Filed: Jan. 28, 2010

(86) PCT No.: PCT/JP2010/000491
§ 371 (c)(1),
(2), (4) Date: Aug. 11, 2011

(87) PCT Pub. No.: WO2010/116581
PCT Pub. Date: Oct. 14, 2010

(65) Prior Publication Data
US 2011/0315428 A1    Dec. 29, 2011

(30) Foreign Application Priority Data
Apr. 7, 2009    (JP) .................... PCT/JP2009/001604

(51) Int. Cl.
*H01H 33/12*    (2006.01)
(52) U.S. Cl.
USPC .................................. 218/18; 218/68; 218/85
(58) Field of Classification Search
USPC ............................................... 218/18, 68, 85
See application file for complete search history.

(56) References Cited

U.S. PATENT DOCUMENTS

| | | | | |
|---|---|---|---|---|
| 2,757,261 A | * | 7/1956 | Lingal et al. | 218/68 |
| 2,798,922 A | * | 7/1957 | Lingal et al. | 218/85 |
| 4,505,033 A | * | 3/1985 | Wheeler | 29/887 |
| 4,563,556 A | * | 1/1986 | Goldstein | 200/82 B |
| 4,707,576 A | * | 11/1987 | Gessinger et al. | 218/18 |

(Continued)

FOREIGN PATENT DOCUMENTS

| | | |
|---|---|---|
| JP | 47-12379 | 6/1972 |
| JP | 60-162340 U | 10/1985 |

(Continued)

OTHER PUBLICATIONS

International Search Report (PCT/ISA/210) issued on Apr. 6, 2010, by Japanese Patent Office as the International Searching Authority for International Application No. PCT/JP2010/000491.

*Primary Examiner* — Truc Nguyen
(74) *Attorney, Agent, or Firm* — Buchanan Ingersoll & Rooney PC (57) ABSTRACT

When electric discharging occurs inside a gas insulated apparatus in which sulfur hexafluoride is filled, hydrogen-fluoride gas is generated, which abrades a part formed of glass fiber reinforced plastics included in the apparatus. Previously, resin for preventing the abrasion has been coated on the surface of the part; however, a problem has occurred that the coating film peels off. Organic fiber woven cloth woven using organic fiber such as aramid fiber or the like having hydrogen fluoride resistance and mechanical toughness is wrapped around the surface of glass fiber reinforced plastics, and thermosetting resin is wettably impregnated into weave patterns of the organic fiber woven cloth and then heat cured; thereby, an abrasion-preventing protection layer that does not peel off is formed.

20 Claims, 9 Drawing Sheets

(56) References Cited

U.S. PATENT DOCUMENTS 7,052,768 B2 * 5/2006 Page et al. .................... 428/413

FOREIGN PATENT DOCUMENTS

| | | |
|---|---|---|
| JP | 7-134909 A | 5/1995 |
| JP | 7-134910 A | 5/1995 |
| JP | 7-161250 A | 6/1995 |
| JP | 7-161260 A | 6/1995 |
| JP | 9-259671 A | 10/1997 |
| JP | 10-86253 A | 4/1998 |
| JP | 11-126545 A | 5/1999 |
| JP | 2006-333567 A | 12/2006 |

* cited by examiner

| Number of turns TN | 0 | 1 | 2 | 4 | 10 | 20 | 40 |
|---|---|---|---|---|---|---|---|
| HF resistance | no good | no good | good | good | good | good | good |

FIG. 5

| Number of turns TN | 0 | 1 | 2 | 4 | 10 | 20 | 40 |
|---|---|---|---|---|---|---|---|
| Void resistance | good | good | good | good | good | good | no good |

FIG. 6

| Number of turns TN | 0 | 1 | 2 | 4 | 10 | 20 | 40 |
|---|---|---|---|---|---|---|---|
| HF resistance | no good | no good | good | good | good | good | good |

FIG. 7

| Number of turns TN | 0 | 1 | 2 | 4 | 10 | 20 | 40 |
|---|---|---|---|---|---|---|---|
| Void resistance | good | good | good | good | good | good | no good |

GAS INSULATED APPARATUS

TECHNICAL FIELD

The present invention relates to a gas insulated apparatus such as a gas breaker and a gas insulated switchgear or the like in which insulating gas is filled.

BACKGROUND ART

An insulating rod used for a gas insulated switchgear or the like is used for electrically insulating and supporting a conducting high-voltage conductor arranged in a metal container in which sulfur hexafluoride is encapsulated. As material used for the insulating rod, glass fiber reinforced plastics (GFRP) which are excellent for electrical insulating properties and mechanical strength are generally adopted. Sulfur hexafluoride is a gas medium excellent for insulating properties and arc-extinguishing properties. However, sulfur hexafluoride is decomposed by electric discharge occurring when current is interrupted, etc., reacts with adsorbed water, etc., inside the container, and hydrogen fluoride gas is resultantly generated. Therefore, the glass fiber forming the insulating rod is eroded by the hydrogen fluoride gas. As a result, the mechanical strength or surface resistance thereof may deteriorate. Accordingly, when the insulating rod formed of GFRP, and a breaker having an electric-discharge-generation portion or the like are installed together in the sealable container in which sulfur hexafluoride is filled, resistance characteristics of the insulating rod against hydrogen fluoride gas is required to be improved.

As methods of improving the hydrogen fluoride-gas resistance characteristics of the insulating rod, means for coating epoxy-modified polyimide resin, alumina-filled paint, or the like on a surface of the GFRP, and substitution of the GFRP by p-aramid fiber reinforced plastics (AFRP) reinforced by p-aramid fiber having excellent hydrogen fluoride resistance characteristics, etc., are proposed (for example, refer to Patent Documents 1 and 2).

PRIOR ART DOCUMENT

Patent Documents

Patent Document 1: Japanese Laid-Open Patent Publication 2006-333,567
Patent Document 2: Japanese Laid-Open Patent Publication H07-134,909

DISCLOSURE OF THE INVENTION

Problems to be Solved by the Invention

In the conventional means for coating the epoxy-modified polyimide resin or the alumina-filled paint on the surface of the GFRP, because strength of the coating film formed by coating the epoxy-modified polyimide resin, the alumina-filled paint or the like is weak, deterioration caused by peeling or the like occurs, and therefore retention of corrosion resistance is not necessarily easy. Moreover, regarding the p-aramid fiber reinforced plastics, because wettability of the p-aramid fiber and its matrix resin is relatively low, voids are easy to generate thereinside; therefore, if partial electric discharging is generated at the void portion generated, breakage might instantly occur.

An objective of the present invention, which is made to solve the above described problems, is to obtain a highly-reliable gas insulated apparatus having hydrogen-fluoride-gas resistance by obtaining woven-cloth glass fiber reinforced composite material provided with a protection layer that does not peel off.

Means for Solving the Problems

A gas insulated apparatus includes a sealed container in which a high-voltage conductor, sulfur hexafluoride for insulating the high-voltage conductor, and a part contacting the sulfur hexafluoride are included, in which the part is formed from organic fiber woven cloth formed by providing a protection layer on a surface of glass fiber reinforced plastics and by wrapping the protection layer around the glass fiber reinforced plastics, and from thermosetting resin impregnated into weave patterns of the organic fiber woven cloth and then heat cured.

Advantageous Effect of the Invention

Regarding the part contacting sulfur hexafluoride used for the gas insulated apparatus configured as described above, because the organic fiber woven cloth woven with the organic fiber is wrapped around the surface of the GFRP, and the thermosetting resin is impregnated into the weave patterns of the organic fiber woven cloth, the wettability between the thermosetting resin corresponding to the matrix resin and the organic fiber can be improved, and the void generation can be prevented; moreover, because the protection layer is formed by wrapping around the surface of the GFRP and by heat curing, the protection layer becomes difficult to peel off, and the part having the strong mechanical strength as well as the hydrogen-fluoride-gas resistance is obtained. As a result, the gas insulated apparatus provided with the hydrogen-fluoride-gas resistance can be obtained.

BEST MODE FOR CARRYING OUT THE INVENTION

Embodiment 1

Figure 1A:
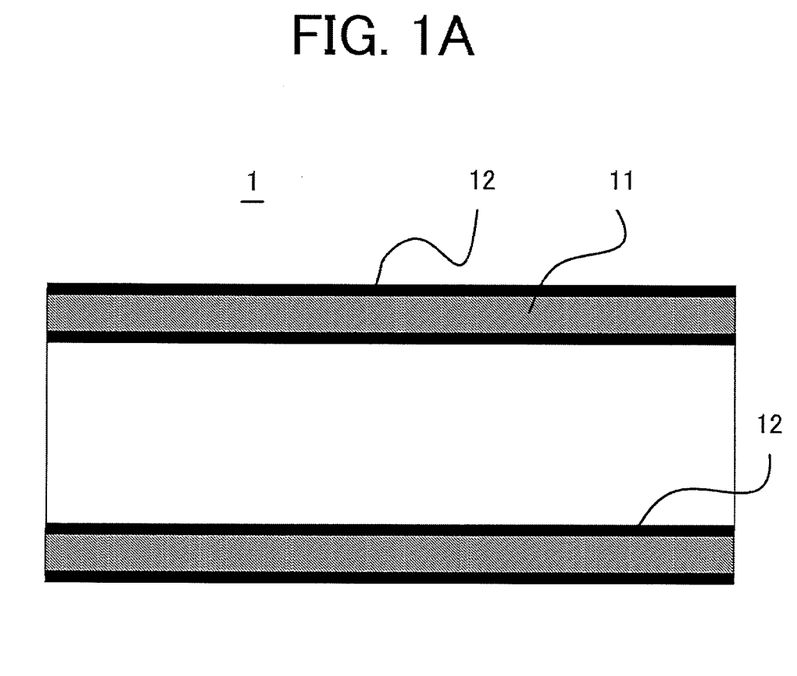
FIGS. 1A and 1B include cross-sectional views illustrating woven-cloth glass fiber reinforced composite material according to Embodiment 1 of the present invention.
Figure 1B:
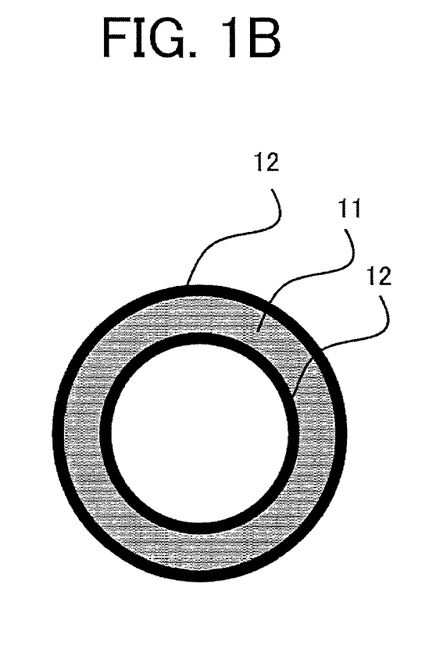
Figure 2A:
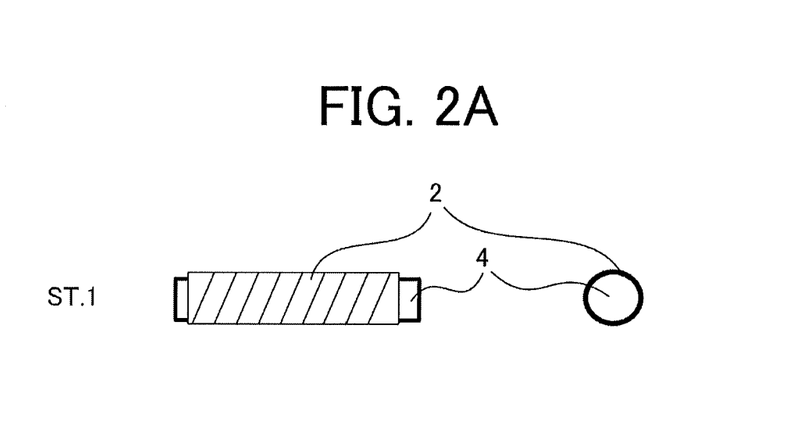
FIGS. 2A, 2B and 2C include explanatory views illustrating steps of producing the woven-cloth glass fiber reinforced composite material according to Embodiment 1 of the present invention.
Figure 2B:
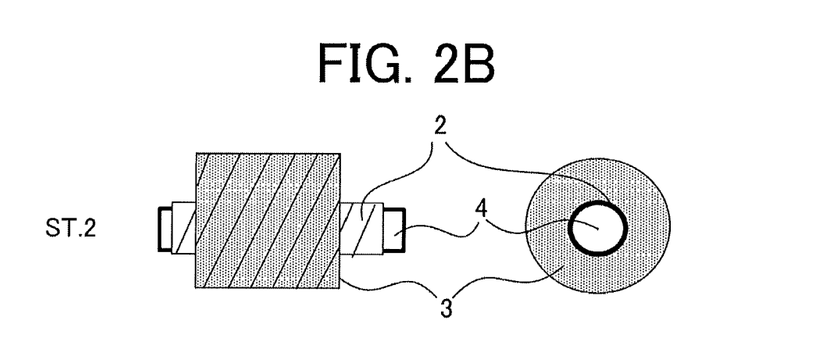
Figure 2C:
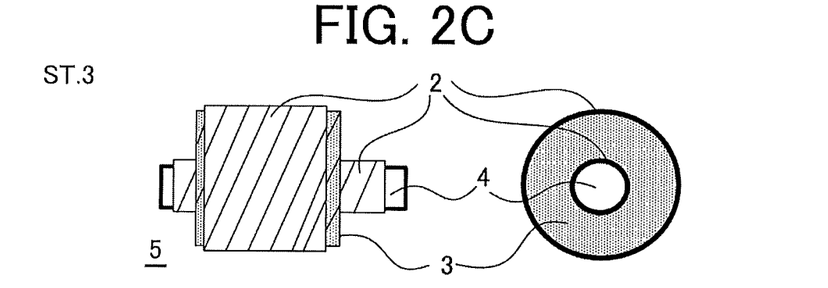
Figure 3A:
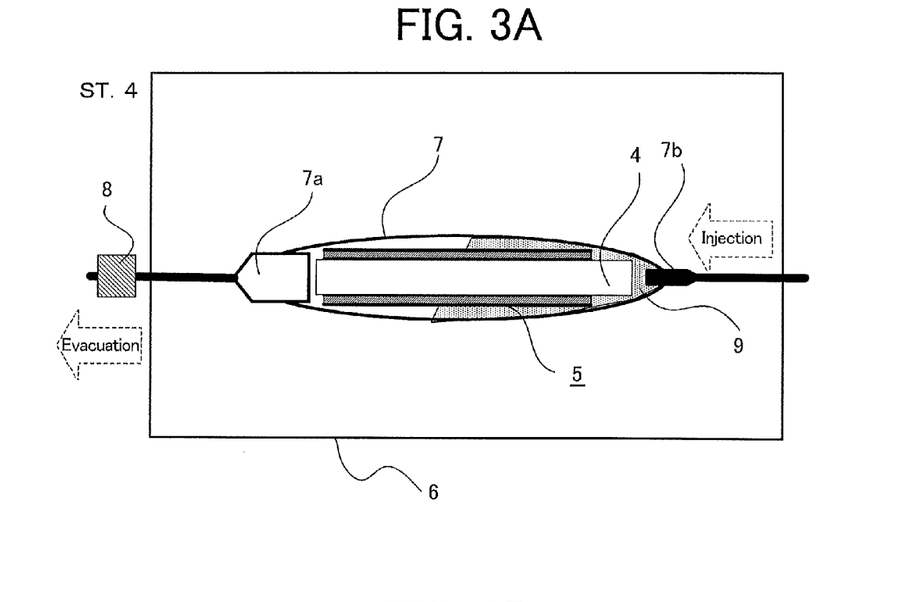
FIGS. 3A and 3B include cross-sectional schematic views illustrating vacuum impregnation apparatuses according to Embodiment 1 of the present invention.
Figure 3B:
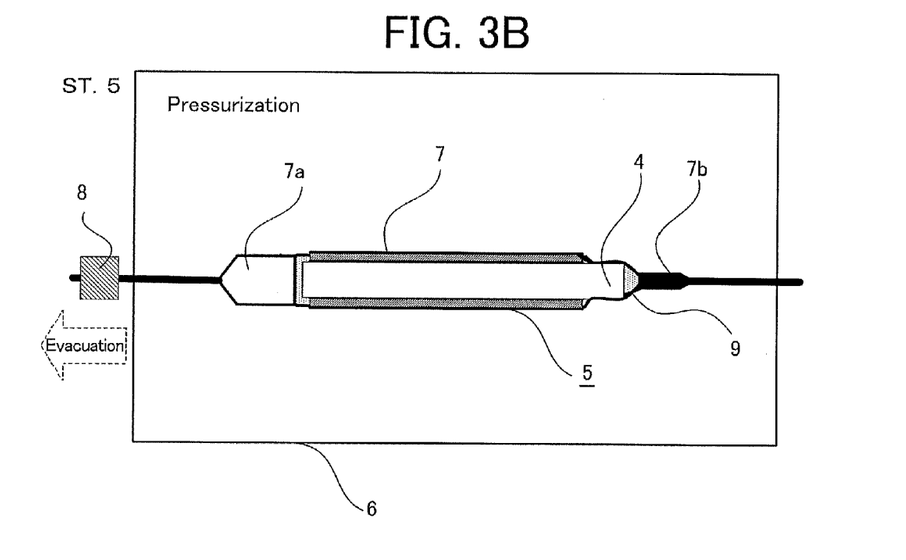
Figure 4:
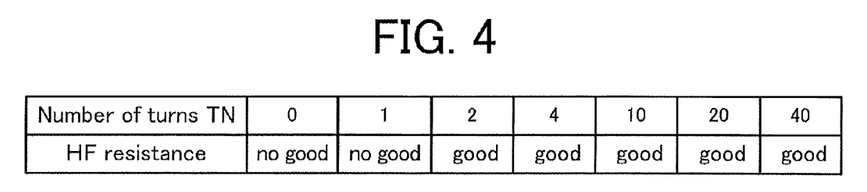
FIG. 4 shows evaluation results of hydrogen-fluoride resistance of the woven-cloth glass fiber reinforced composite material according to Embodiment 1 of the present invention.
Figure 5:
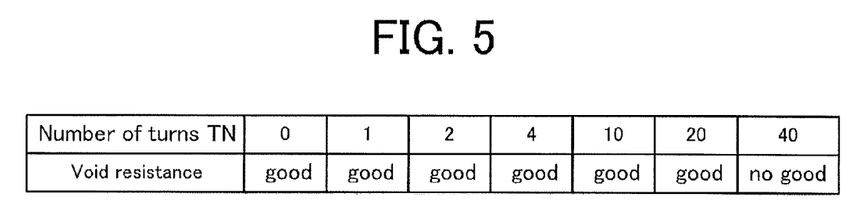
FIG. 5 shows evaluation results representing void generation of the woven-cloth glass fiber reinforced composite material according to Embodiment 1 of the present invention.

Hereinafter, Embodiment 1 according to the present invention is explained in detail based on figures. FIGS. 1A and 1B include cross-sectional views illustrating woven-cloth glass fiber reinforced composite material used for a part of a gas insulated apparatus according to Embodiment 1 of the present invention. FIGS. 2A, 2B and 2C include explanatory views illustrating steps of producing the woven-cloth glass fiber reinforced composite material according to Embodiment 1. FIGS. 3A and 3B include cross-sectional schematic views illustrating a vacuum impregnation apparatus according to Embodiment 1. FIG. 4 shows evaluation results representing hydrogen-fluoride resistance of the woven-cloth glass fiber reinforced composite material according to Embodiment 1. FIG. 5 shows evaluation results representing void generation of the woven-cloth glass fiber reinforced composite material according to Embodiment 1. Here, the same symbols in FIGS. 1A and 1B through FIG. 5 represent the same or equivalent portions thereof.

As illustrated in FIGS. 1A and 1B, woven-cloth glass fiber reinforced composite material 1 according to Embodiment 1 is configured in such a way that protection layers 12, of organic fiber reinforced plastics, formed by impregnating thermoplastic matrix resin such as epoxy resin into weave patterns of p-aramid fiber woven cloth (a kind of organic fiber woven cloth) obtained by weaving p-aramid fiber, and by heat curing the resin are provided outside and inside of cylindrical glass fiber reinforced plastics (hereinafter, referred to as GFRP) having an outside diameter of 60 mm and a thickness of 10 mm. The p-aramid fiber woven cloth used here, whose thickness is 0.25 mm, has been produced by weaving warp and woof of the p-aramid fiber having a fiber diameter of 15 µm. Hereinafter, production steps (Step 1 through Step 6) of the woven-cloth glass fiber reinforced composite material 1 according to Embodiment 1 of the present invention are explained based on FIGS. 2A, 2B and 2C and FIGS. 3A and 3B.

Step 1 (ST. 1).

P-aramid fiber woven cloth 2, whose thickness is 0.25 mm, cut in a tape shape, and glass fiber woven cloth 3 whose thickness is 0.17 mm are prepared. The tape-shaped p-aramid fiber woven cloth 2 is wrapped, for a predetermined number of turns with the tensile strength of several tens kg, around rod-like core metal 4, whose diameter is 40 mm, to be a forming mold.

Step 2 (ST. 2).

The glass fiber woven cloth 3 is wrapped therearound with the tensile strength of several tens kg until the thickness thereof becomes 10 mm.

Step 3 (ST. 3).

Moreover, the p-aramid fiber woven cloth 2 is wrapped therearound for a predetermined number of turns with the tensile strength of several tens kg, and then a tape stopper is attached thereoutside; thereby, an aggregate 5 is formed.

Step 4 (ST. 4).

In the vacuum impregnation apparatus represented in FIGS. 3A and 3B, a film-made sealed bag 7 in which the aggregate 5 can be housed is provided in a pressurizable sealed container 6. A suction opening 7a is provided at one end of the sealed bag 7, and thereby the apparatus is configured in such a way that vacuum evacuation can be carried out by a rotary pump 8 provided outside the sealed container 6. An injection opening 7b is provided at the other end of the sealed bag 7, and liquid matrix resin 9 can be injected therethrough.

The aggregate 5 formed over the core metal 4 is installed in the film-made sealed bag 7 arranged inside the sealed container 6 as illustrated in FIG. 3A, and then vacuum evacuation is carried out from the suction opening 7a at the end of the sealed bag 7. Simultaneously, the liquid matrix resin 9 heated up to 60 degrees C. is injected from the injection opening 7b at the other end thereof thus, the impregnation into the aggregate 5 is progressed. The matrix resin 9 used here is bisphenol A type epoxy resin with which a curing agent is mixed.

Step 5 (ST. 5).

As illustrated in FIG. 3B, the aggregate 5 impregnated by the epoxy resin (matrix resin) 9 is continuously vacuum evacuated and heated up to 130 degrees C.; concurrently, the aggregate 5 is thermal-curing processed for several hours with pressurizing the inside of the sealed container 6.

Step 6.

The woven-cloth glass fiber reinforced composite material 1, after the thermal-curing is completed, is taken out, with the core metal 4, from the sealed container 6, and then separated from the sealed bag 7 and the core metal 4; thus, the production steps of the woven-cloth glass fiber reinforced composite material 1 are completed.

FIG. 4 shows the evaluation results representing the hydrogen-fluoride resistance of the woven-cloth glass fiber reinforced composite material, in which woven-cloth glass fiber reinforced composite material specimens produced in the above production steps while varying the number of turns (TN) of the p-aramid fiber woven cloth 3 provided outside and inside of the glass fiber woven cloth 3 are prepared, each dipped for two hours in dilute hydrogen-fluoride aqueous solution whose concentration is 0.3%, and then evaluated by observing their surfaces before and after the dipping operations. "No good" in FIG. 4 indicates surface degradation of the woven-cloth glass fiber reinforced composite material in which discolored portions are observed on the surface thereof while the "good" indicates no degradation of the woven-cloth glass fiber reinforced composite material in which no discolored portions are observed. It can be determined from FIG. 4 that, by providing the protection layers 12 having the thickness of 0.5 mm or more, which is formed of the p-aramid fiber 12 produced by wrapping the p-aramid fiber woven cloth 2 around the GFRP 11 twice, the hydrogen-fluoride resistance is given to the woven-cloth glass fiber reinforced composite material.

FIG. 5 shows the evaluation results, representing a void generation state in the p-aramid fiber 12, in which the woven-cloth glass fiber reinforced composite material 1 whose hydrogen-fluoride resistance is evaluated as represented in FIG. 4 is cut, and its cross-section is observed. "No good" in FIG. 5 indicates that voids are observed around a thickness center of the p-aramid fiber woven cloth 2, while "good"

indicates that voids are found nowhere in the p-aramid fiber woven cloth 2 wrapped. In specimens in which the p-aramid fiber woven cloth 2 is wrapped for more than 20 turns around the GFRP 11, that is, the protection layer 12 having the thickness of 5 mm or more, which is formed of the p-aramid fiber 12, is provided, the voids are observed around the thickness center of the p-aramid fiber woven cloth 2; accordingly, it is found from FIG. 5 that hazards of void generation increase.

According to the above results, the woven-cloth glass fiber reinforced composite material 1 in which the protection layer 12 having the p-aramid fiber woven cloth 2 is provided in a range from 0.5 mm to 5 mm around the GFRP 11 can be considered to be void-free structural material having excellent hydro-fluoride-resistance. Here, as the matrix resin of the woven-cloth glass fiber reinforced composite material using the p-aramid fiber woven cloth 2, the epoxy resin has been used; however, according to many other experimental results, it has been confirmed that, by using thermosetting resin such as phenol resin or polyester resin instead of the epoxy resin, void-free woven-cloth glass fiber reinforced composite material having excellent hydro-fluoride resistance similar to that can be obtained. Even if m-aramid fiber woven cloth as its isomeric one is used instead of the p-aramid fiber woven cloth 2, the woven-cloth glass fiber reinforced composite material 1 having similar hydro-fluoride resistance can be obtained. Here, the woven-cloth glass fiber reinforced composite material using the m-aramid fiber woven cloth has a particular effect that the material has higher heat resistance comparing to that using the p-aramid fiber woven cloth.

Embodiment 2

Figure 6:
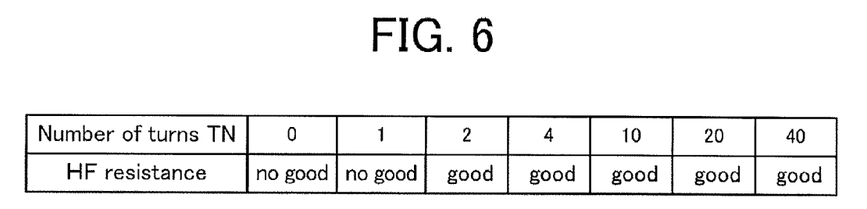
FIG. 6 shows evaluation results of hydrogen-fluoride resistance of woven-cloth glass fiber reinforced composite material according to Embodiment 2 of the present invention.
Figure 7:
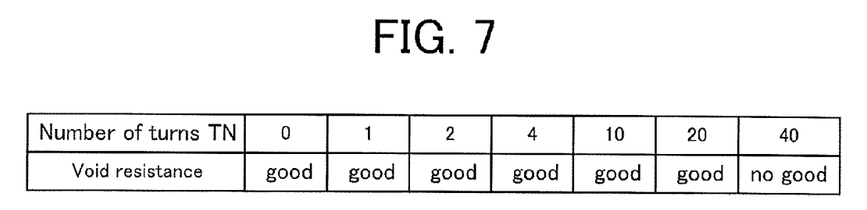
FIG. 7 shows evaluation results representing void generation of the woven-cloth glass fiber reinforced composite material according to Embodiment 2 of the present invention.

Hereinafter, Embodiment 2 according to the present invention is explained in detail based on figures. FIG. 6 shows evaluation results representing hydro-fluoride resistance of woven-cloth glass fiber reinforced composite material used for a part of a gas insulated apparatus according to Embodiment 2. FIG. 7 shows evaluation results representing void generation of the woven-cloth glass fiber reinforced composite material according to Embodiment 2. Here, in each of portions in FIG. 6 or FIG. 7, the same symbols are given to the same or equivalent portions in FIGS. 1A and 1B through FIG. 5.

In Embodiment 1, the woven-cloth glass fiber reinforced composite material 1 has been formed by providing around the GFRP 11 the protection layers 12 formed of the organic fiber reinforced plastics using the p-aramid fiber woven cloth, and the hydro-fluoride resistance, etc. thereof has been explained. In Embodiment 2, the woven-cloth glass fiber reinforced composite material has been formed in the same condition as that in Embodiment 1 except for a point that the protection layers 12 have been formed using polyarylate fiber woven cloth instead of the p-aramid fiber woven cloth. After that, the hydro-fluoride resistance and the void generation thereof has been evaluated similarly to that in Embodiment 1. The polyarylate fiber woven cloth used here, whose thickness is 0.25 mm, has been produced by weaving warp and woof of the polyarylate fiber having a fiber diameter of 15 μm.

FIG. 6 shows the evaluation results representing the hydrogen-fluoride resistance of the woven-cloth glass fiber reinforced composite material, in which woven-cloth glass fiber reinforced composite material specimens produced while varying the number of turns TN of polyarylate fiber woven cloth 9 provided outside and inside of the glass fiber woven cloth 3 are prepared, each dipped for three hours in dilute hydrogen-fluoride aqueous solution whose concentration is 0.3%, and then evaluated by observing their surfaces before and after the dipping operations. It can be determined from FIG. 6 that, by providing the protection layers 12 having the thickness of 0.5 mm or more, which is formed of the polyarylate fiber produced by wrapping the polyarylate fiber woven cloth 9 around the GFRP 11 twice, the hydrogen-fluoride resistance is given to the woven-cloth glass fiber reinforced composite material 1.

FIG. 7 shows evaluation results representing the void generation for the woven-cloth glass fiber reinforced composite material whose hydrogen-fluoride resistance has been evaluated as represented in FIG. 6. The evaluation results of the void generation state in the polyarylate fiber were obtained by cutting the woven-cloth glass fiber reinforced composite material and observing its cross-section. In a specimen in which the polyarylate fiber woven cloth 9 is wrapped more than 20 times around the GFRP 11, that is, the protection layers 12, formed of the polyarylate fiber, having the thickness of 5 mm or more are provided, it is found from FIG. 7 that, a void is observed around a thickness center of the GFRP 11 and the polyarylate fiber woven cloth 2, which indicates that a void-generation risk increases.

According to the above results, the woven-cloth glass fiber reinforced composite material in which the protection layer 12 having the polyarylate fiber woven cloth 9 is provided in a range from 0.5 mm to 5 mm around the GFRP 11 can be considered to be void-free structural material having excellent hydro-fluoride-resistance. Here, as the matrix resin of the woven-cloth glass fiber reinforced composite material using the polyarylate fiber woven cloth 9, the epoxy resin has been used; however, it is confirmed from many other experimental results that, by using thermosetting resin such as phenol resin or polyester resin instead of the epoxy resin, void-free and excellent hydro-fluoride-resistant woven-cloth glass fiber reinforced composite material similar to that can be obtained.

The inside shape of the woven-cloth glass fiber reinforced composite material 1 according to Embodiments 1 and 2 reflects the surface shape of the core metal 4 used for the molding. By previously providing a screw thread on the surface of the core metal 4, an attaching portion for connecting another part can be provided on the woven-cloth glass fiber reinforced composite material to be molded. Moreover, by opening a hole using an electromotive drill, etc. in the molded woven-cloth glass fiber reinforced composite material 1, another part can also be screwed to the material using the hole. Accordingly, the woven-cloth glass fiber reinforced composite material according to the present invention can be easily molded or machined into a shape of a part such as an insulating rod used for a gas insulated apparatus such as a gas breaker or a gas insulated switchgear in which sulfurhexafluoride is filled, and also be formed into a shape attachable to another part. That is, especially for a device including a sealed space in which hydrogen-fluoride gas may be generated, or that including a space in which hydrogen-fluoride gas is enclosed, the woven-cloth glass fiber reinforced composite material according to the present invention is obvious to be an effective part in which neither mechanical strength nor surface resistance decreases.

Embodiment 3

Figure 8A:
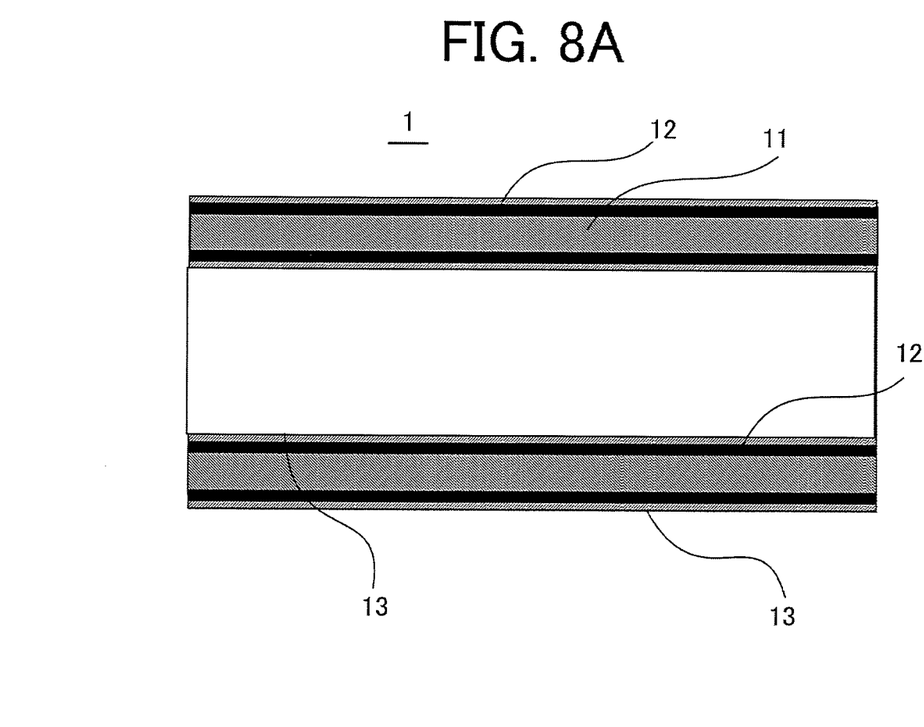
FIGS. 8A and 8B include cross-sectional views illustrating woven-cloth glass fiber reinforced composite material according to Embodiment 3 of the present invention.
Figure 8B:
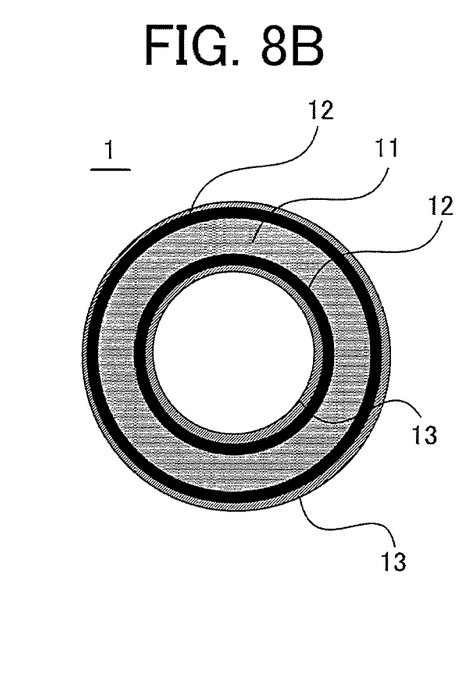

Hereinafter, Embodiment 3 according to the present invention is explained in detail based on figures. FIGS. 8A and 8B include cross-sectional views illustrating woven-cloth glass fiber reinforced composite material used for a part of a gas insulated apparatus according to Embodiment 3. Here, in each of portions in FIGS. 8A and 8B, the same symbols are given to the same or equivalent portions in FIGS. 1A and 1B through FIG. 7.

In a case in which a hole is drilled, using an electromotive drill, etc., in the woven-cloth glass fiber reinforced composite material using the p-aramid fiber woven cloth or the polyarylate fiber woven cloth represented in Embodiment 1 or 2, because the organic fiber constituting such woven cloth has high toughness, a problem occurs that, especially when the cutting blade of the drill passes therethrough, peeling of the outermost layer from the woven cloth or fuzzing on the organic fiber constituting the woven cloth easily occurs. The woven-cloth glass fiber reinforced composite material according to Embodiment 3 is invented for removing the peeling of the outermost layer from the p-aramid fiber woven cloth as well as the fuzzing.

As illustrated in FIGS. 8A and 8B, on the woven-cloth glass fiber reinforced composite material 1 according to Embodiment 3, fixing layers 13 are provided which are formed by newly wrapping up PBN (poly(butylene naphthalate)) fiber nonwoven cloth as a kind of polyester fiber nonwoven cloth outside and inside the woven-cloth glass fiber reinforced composite material 1 represented in Embodiments 1 and 2, impregnating thermoplastic matrix resin such as epoxy resin thereinto, and then heat curing it. Hereinafter, production processes of the woven-cloth glass fiber reinforced composite material 1 according to Embodiment 3 are explained.

The aggregate 5 is formed by first wrapping the tape-shaped PBN fiber nonwoven cloth around the core metal 4 as the forming mold, and then sequentially wrapping therearound the organic fiber woven cloth 2 such as the p-aramid one, the glass fiber woven cloth 3, the organic fiber woven cloth 2, and the PBN fiber nonwoven cloth, in this order. The thermosetting resin as the matrix resin is impregnated into each of the woven and nonwoven cloths forming the aggregate 5 similarly to Embodiment 1, and then heat cured. By removing the heat-cured woven-cloth glass fiber reinforced composite material 1 according to Embodiment 3 from the core metal 4, a series of production processes of Embodiment 3 is finished.

Adhesiveness between PBN and epoxy resin as the matrix resin of the woven-cloth glass fiber reinforced composite material 1 is extremely high; moreover, by using the PBN nonwoven cloth, the fixing layers 13 molded on the woven-cloth glass fiber reinforced composite material 1 according to Embodiment 3 has high stretch properties and shape stability, and therefore, even if the cutting blade of the drill passes through the woven-cloth glass fiber reinforced composite material 1, neither peeling nor fuzzing of the organic fiber such as the p-aramid fiber or the polyarylate fiber occurs. Because the fixing layers 13 molded on the woven-cloth glass fiber reinforced composite material 1 according to Embodiment 3 have high chemical resistance, there is an effect of improving the hydrogen-fluoride resistance.

Here, although the PBN nonwoven cloth is used for forming the fixing layers in Embodiment 3, even if polyester nonwoven cloth such as PET (poly(etylene terephthalate)) nonwoven cloth, PTT (poly(trimethylene terephthalate)) nonwoven cloth, PBT (poly(butylene terephthalate)) nonwoven cloth, or PEN (poly(ethylene naphthalate)) nonwoven cloth is used, the peeling and the fuzzing of the organic fiber can be similarly prevented. Here, as the matrix resin of the woven-cloth glass fiber reinforced composite material 1, the epoxy resin has been used; however, it has been confirmed from many other experimental results that, by using thermosetting resin such as phenol resin or polyester resin instead of the epoxy resin, the woven-cloth glass fiber reinforced composite material in which neither the peeling nor the fuzzing of the organic fiber occurs can be obtained.

Here, in Embodiment 3, the polyester nonwoven cloth which is especially easy to be impregnated with the thermoplastic matrix resin (by which the production time is easy to be shortened) has been used; however, polyester woven cloth other than the non-woven cloth may be used for forming the fixing layers. That is, the fixing layers molded on the woven-cloth glass fiber reinforced composite material 1 using the polyester woven cloth has high stretch properties and shape stability; therefore, even if the cutting blade of the drill passes therethrough, neither the peeling nor the fuzzing of the organic fiber such as the p-aramid fiber or the polyarylate fiber included in the woven-cloth glass fiber reinforced composite material 1 occurs. That is, the polyester cloth is suitably used for forming the fixing layer.

Embodiment 4

Figure 9A:
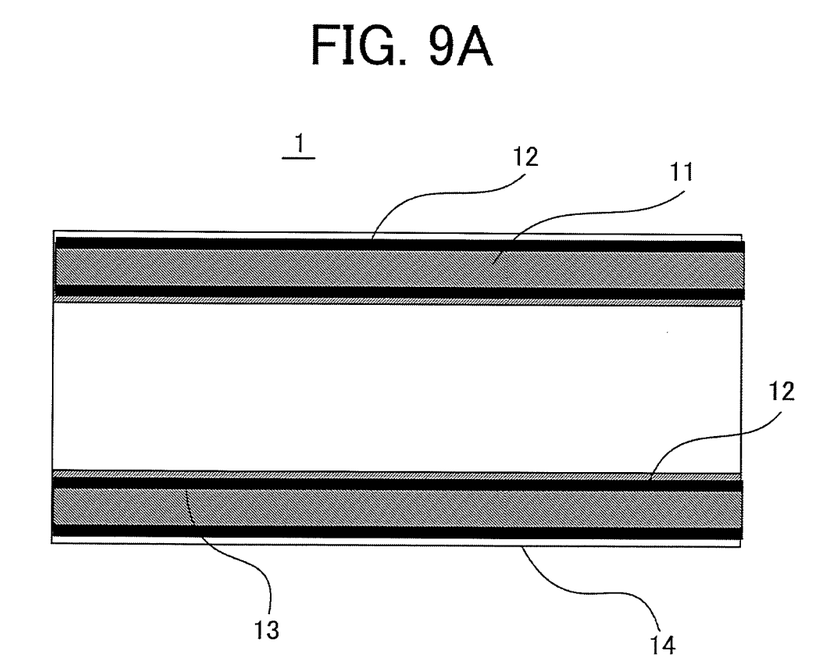
FIGS. 9A and 9B include includes cross-sectional views illustrating woven-cloth glass fiber reinforced composite material according to Embodiment 4 of the present invention.
Figure 9B:
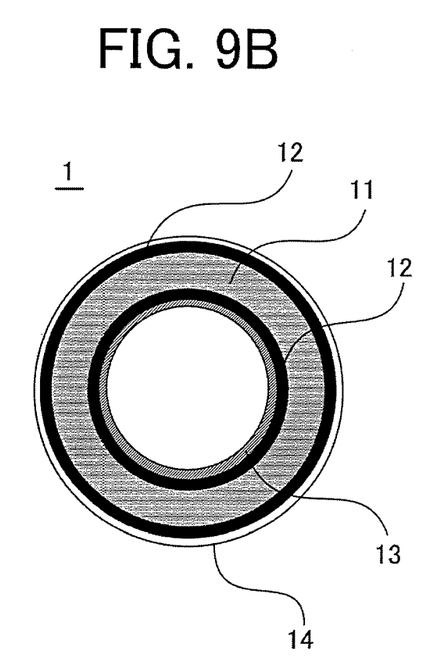
Figure 10:
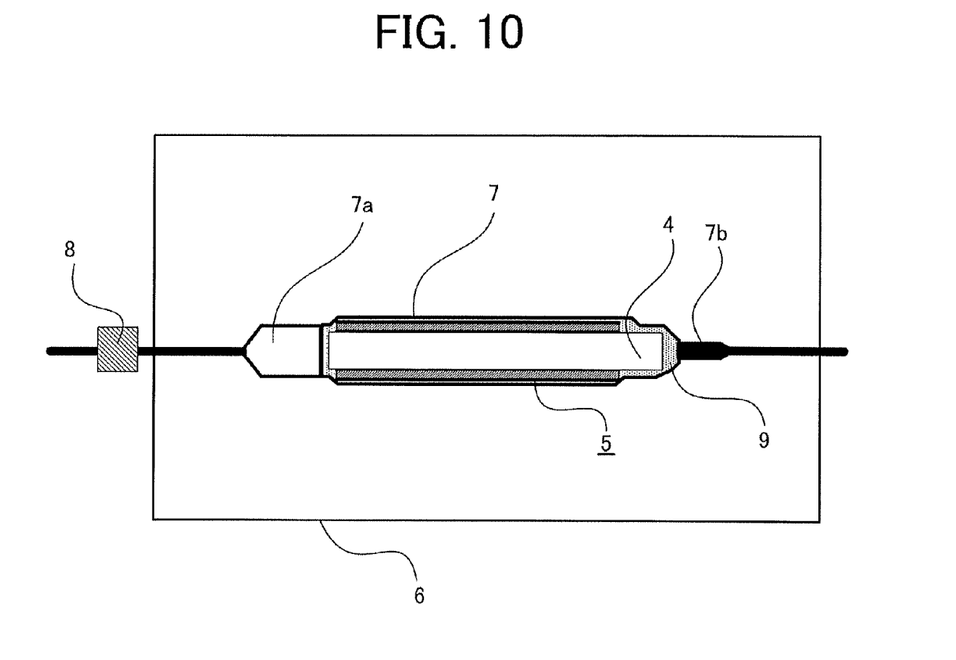
FIG. 10 is a cross-sectional schematic view illustrating a vacuum impregnation apparatus according to Embodiment 4 of the present invention.

Hereinafter, Embodiment 4 according to the present invention is explained in detail based on figures. FIGS. 9A and 9B include cross-sectional views illustrating woven-cloth glass fiber reinforced composite material used for a part of a gas insulated apparatus according to Embodiment 4. FIG. 10 is a cross-sectional schematic view of a vacuum impregnation apparatus according to Embodiment 4. Here, in each of portions in FIGS. 9A and 9B and FIG. 10, the same symbols are given to the same or equivalent portions in FIGS. 1A and 1B through FIGS. 8A and 8B.

The woven-cloth glass fiber reinforced composite material 1 according to Embodiment 3 is configured in such a way that the fixing layers 13 using the PBN nonwoven cloth as a kind of the polyester-resin one are provided on the surfaces of the outside and the inside of the woven-cloth glass fiber reinforced composite material 1 represented in Embodiments 1 and 2. The woven-cloth glass fiber reinforced composite material 1 according to Embodiment 4 is configured in such a way that a fixing layer 13 using the PBN nonwoven cloth is provided on the surface of the inside of the woven-cloth glass fiber reinforced composite material 1, and a matrix-resin layer 14 is provided on the surface of the outside of the woven-cloth glass fiber reinforced composite material 1. Hereinafter, production processes of the woven-cloth glass fiber reinforced composite material 1 according to Embodiment 4 are explained.

The aggregate 5 is formed by first wrapping the tape-shaped PBN nonwoven cloth around the core metal 4 being the forming mold, and then sequentially wrapping therearound the organic fiber woven cloth 2 such as the p-aramid one, the glass fiber woven cloth 3, and the organic fiber woven cloth 2, in this order. The thermosetting resin as the matrix resin is impregnated into the aggregate 5 similarly to Embodiment 1, and then heat cured. However, when the heat curing is carried out, controlling is performed so that the heat curing resin as the matrix resin remains on the surface of the aggregate 5 as represented in FIGS. 9A and 9B. By removing the heat-cured woven-cloth glass fiber reinforced composite material 1 according to Embodiment 4 from the core metal 4, a series of production processes is finished.

The matrix-resin layers 14 formed on the outermost periphery of the woven-cloth glass fiber reinforced composite material 1 according to Embodiment 4 can prevent the p-aramid fiber used for the woven-cloth glass fiber reinforced composite material 1 and the organic fiber such as the polyarylate fiber similarly to the woven-cloth glass fiber reinforced composite material according to Embodiment 3 from peeling and fuzzing. Therefore, even if a hole is drilled, using an electromotive drill, etc., in the woven-cloth glass fiber reinforced composite material 1 according to Embodiment 4, neither the peeling nor the fuzzing of the organic fiber occurs.

As explained above, the woven-cloth glass fiber reinforced composite material 1 according to Embodiments 3 and 4, similarly to that according to Embodiments 1 and 2, is obvious to be an effective part in which neither mechanical strength nor surface resistance decreases by electric discharging phenomenon or the like, for a gas insulated apparatus having a sealed space in which hydrogen-fluoride gas may be generated, or that having a space in which hydrogen-fluoride gas is enclosed.

Regarding each of the woven-cloth glass fiber reinforced composite material 1 according to Embodiments 1 through 4, the protection layers 12 are provided on the outside and the inside of the cylindrical GFRP 11; however, the shape of the GFRP 11 need not be cylindrical, but may be a rod-shaped one having no inside face. In such a case, the rod-shaped GFRP is previously formed by an injection molding method or the like, and then the aggregate is formed by using the GFRP as the core metal, and wrapping the organic fiber woven cloth therearound; thereby, the protection layers covering the GFRP can be provided using the vacuum impregnation apparatus similarly to that in Embodiment 1. In this case, because the process of forming the aggregate layer of the GFRP, and that of removing the woven-cloth glass fiber reinforced composite material from the core metal, which is performed after the heat curing, become needless, an effect of improving the productivity can be obtained.

The protection layers 12 of the woven-cloth glass fiber reinforced composite material 1 used for a part of the gas insulated apparatus according to Embodiments 1 through 4 include the p-aramid fiber or the polyarylate fiber whose strength and elasticity are higher than those of the glass fiber, so that the mechanical strength thereof is higher than the conventional GFRP. Therefore, because the part formed by the woven-cloth glass fiber reinforced composite material according to Embodiments 1 through 4 has the mechanical strength higher than that of the part formed of the conventional GFRP, a particular effect can be obtained that the part has a high mechanical reliability and its size can be reduced. Accordingly, as a part used for the gas insulated apparatus having an electric discharging portion, such as the gas breaker to which small-size, high-voltage and large-capacitance performance is given, the woven-cloth glass fiber reinforced composite material 1 according to Embodiment 1 through 4 may be said to be suitable. Additionally, for a puffer-type gas breaker or the like having a complicated part configuration for extinguishing, by blowing sulfur hexafluoride, arc produced by electric discharge generated between contacts at breaking, because the configuration parts can be downsized, the material is especially suitable.

Embodiment 5

Figure 11A:
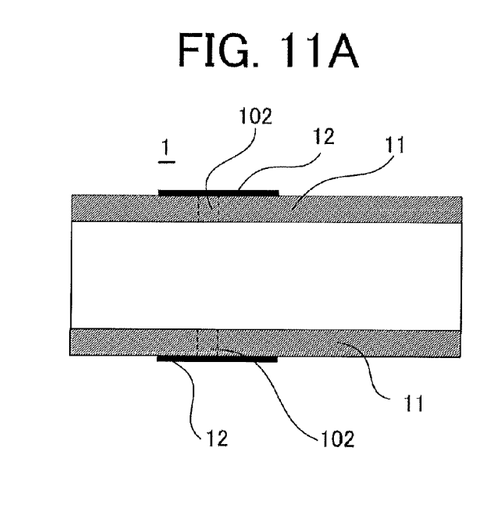
FIGS. 11A and 11B include cross-sectional views illustrating woven-cloth glass fiber reinforced composite material according to Embodiment 5 of the present invention.
Figure 11B:
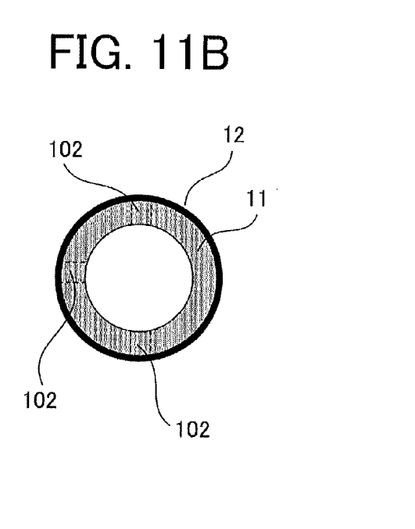
Figure 12:
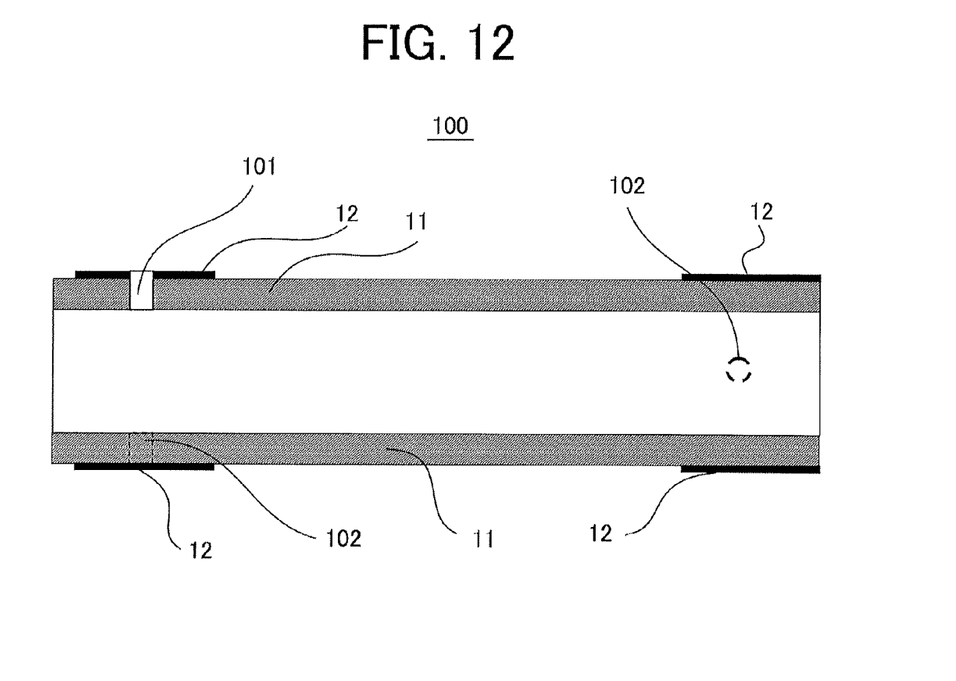
FIG. 12 is a cross-sectional view illustrating an insulating rod according to Embodiment 5 of the present invention.

Hereinafter, Embodiment 5 according to the present invention is explained in detail based on figures. FIGS. 11A and 11B include cross-sectional views illustrating woven-cloth glass fiber reinforced composite material used for a part of a gas insulated apparatus according to Embodiment 5, while FIG. 12 is a cross-sectional view illustrating an insulating rod using the woven-cloth glass fiber reinforced composite material according to Embodiment 5. Here, in each of portions in FIGS. 11A and 11B and FIG. 12, the same symbols are given to the same or equivalent portions in FIGS. 1A and 1B through FIG. 10.

The woven-cloth glass fiber reinforced composite material 1 according to Embodiments 1 through 4 is configured in such a way that the protection layers 12 formed of organic fiber reinforced plastics are provided on the outside and the inside of the GFRP 11. As illustrated in FIGS. 11A and 11B, the woven-cloth glass fiber reinforced composite material 1 according to Embodiment 5 of the invention is configured in such a way that the protection layer 12 formed of organic fiber reinforced plastics is provided only at a specific portion on the outside of the GFRP 11. In Embodiment 5 according to the present invention, an example is explained in a case in which the woven-cloth glass fiber reinforced composite material 1 in Embodiment 5 according to the present invention is applied to an insulating rod 100 being a part of the gas insulated apparatus.

Meanwhile, although the GFRP forming the conventional insulating rod may deteriorate in the mechanical strength or the surface electrical resistivity by hydrogen-fluoride gas, the deterioration does not proceed rapidly. Moreover, retention of strong mechanical strength and uniformly high surface electrical resistivity is not necessary all over the entire insulating rod. A portion of the part where the strong mechanical strength is needed corresponds to that to which high stress is applied or that where the mechanical strength is structurally low. For example, in the insulating rod, it is a portion that is connected to another part, and especially a portion around a hole provided for connecting to another part. Hereinafter, production processes of the woven-cloth glass fiber reinforced composite material 1 according to Embodiment 5 are explained.

The aggregate 5 is formed by first wrapping the tape-shaped glass fiber woven cloth 3 on the core metal 4 as the forming mold, and then wrapping the organic fiber woven cloth 2 around a specific portion thereon. Here, the specific portion corresponds to that around expected positions 102 of holes 101 planned to be opened in the insulating rod 100. The thermosetting resin as the matrix resin is impregnated into the aggregate 5 similarly to Embodiment 1, and then heat cured. By removing the heat-cured woven-cloth glass fiber reinforced composite material 1 according to Embodiment 5 from the core metal 4, a series of production processes is finished.

FIG. 12 illustrates the insulating rod 100 formed by using the woven-cloth glass fiber reinforced composite material 1 according to Embodiment 5 of the present invention. The protection layers 12 formed of the organic fiber reinforced plastics are formed at both ends (specific portions) outside the insulating rod 100. In the specific portions on which the protection layers 12 are formed, the holes 101 to be opened by an electric drill or the like for connecting another part which is not illustrated, or the expected positions 102 at which the holes 101 are opened are marked thereon.

Because the deterioration in the mechanical strength and the surface electrical resistivity of the portions in which the protection layers 12 are formed does not proceed, the strong mechanical strength and the high surface electrical resistivity are retained comparing to those of portions in which the protection layers 12 are not formed. Accordingly, the insulating rod 100 of Embodiment 5 obviously retains the mechanical strength stronger than that of the conventional insulating rod formed of the GFRP on which the protection layers 12 are not provided.

Additionally, because the protection layers 12 using the expensive p-aramid fiber and polyarylate fiber are not provided all over the entire insulating rod 100, an effect is obtained that its production cost can be reduced more than that in a case of the protection layers 12 being provided over the entire insulating rod 100. Here, in the part produced using the woven-cloth glass fiber reinforced composite material 1, because the specific portions on which the protection layers 12 are formed are designed by a manufacturer, it is needless to be especially determined portions. That is, the part produced by using the woven-cloth glass fiber reinforced composite material 1 is configured in such a way that the protection layers 12 of the organic fiber reinforced plastics are formed at some portions thereof. Accordingly, the gas insulated apparatus, according to Embodiment 5 of the present invention, in which such layers 12 are formed, having the portions retaining the strong mechanical strength and the high surface conductivity is obviously a part having higher hydrogen-fluoride-gas resistance comparing to that of the conventional part in which the protection layers 12 are not provided.

Embodiment 6

Figure 13A:
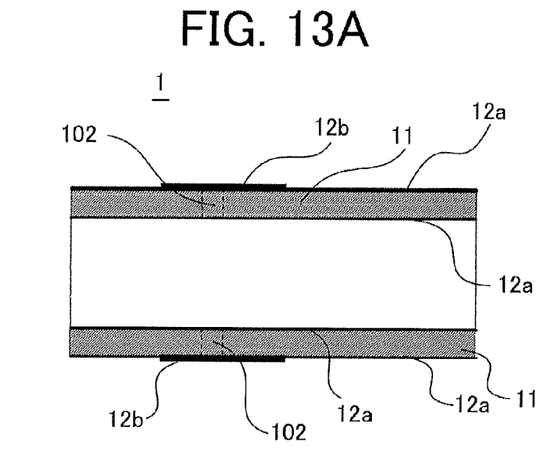
FIGS. 13A and 13B include cross-sectional views illustrating woven-cloth glass fiber reinforced composite material according to Embodiment 6 of the present invention.
Figure 13B:
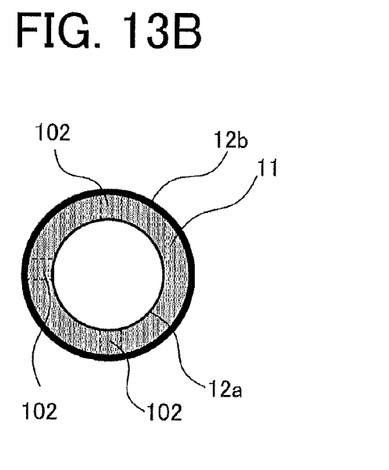
Figure 14:
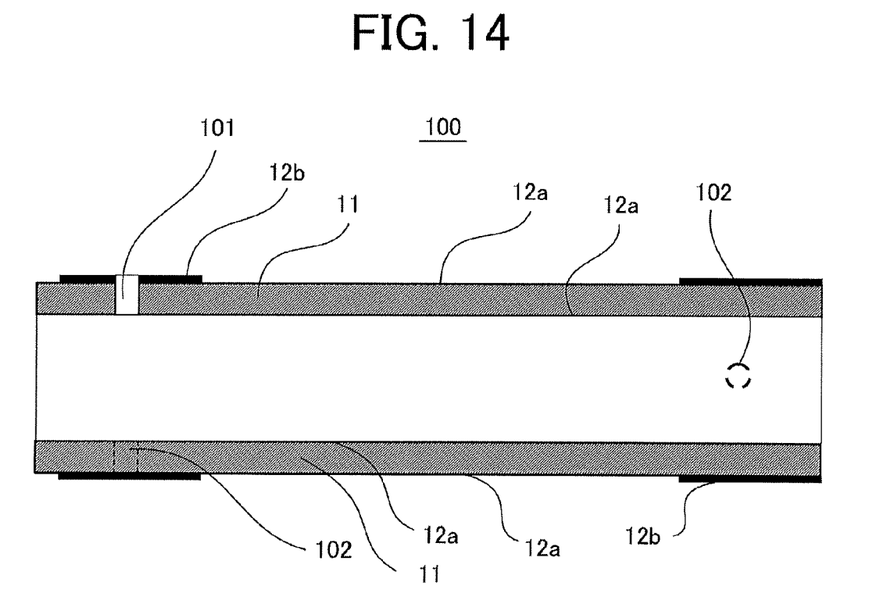
FIG. 14 is a cross-sectional view illustrating an insulating rod according to Embodiment 6 of the present invention.

Hereinafter, Embodiment 6 according to the present invention is explained in detail based on figures. FIGS. 13A and 13B include cross-sectional views illustrating woven-cloth glass fiber reinforced composite material used for a part of a gas insulated apparatus according to Embodiment 6, while FIG. 14 is a cross-sectional view of an insulating rod using the woven-cloth glass fiber reinforced composite material according to Embodiment 6. Here, in each of portions in FIGS. 13A and 13B and FIG. 14, the same symbols are given to the same or equivalent portions in FIGS. 1A and 1B through FIG. 12.

The woven-cloth glass fiber reinforced composite material 1 according to Embodiment 5 of the present invention is configured in such a way that the protection layers 12 are provided only at specific portions on the outside of the GFRP 11. As illustrated in FIGS. 13A and 13B, the woven-cloth glass fiber reinforced composite material 1 according to Embodiment 6 of the present invention is configured in such a way that the thickness of the protection layer 12 at a specific portion of the GFRP 11 is thickened. Hereinafter, production processes of the woven-cloth glass fiber reinforced composite material 1 according to Embodiment 6 of the present invention, and the insulating rod 100 using this material are explained.

The aggregate 5 is formed by wrapping the tape-shaped organic fiber woven cloth 2 at least once around the core metal 4 being the forming mold, wrapping the tape-shaped glass fiber woven cloth 3 therearound, and then wrapping the organic fiber woven cloth 2 therearound so that only specific portions thereon are one or more turns thicker than the other portions. Here, the specific portions are positioned in the periphery of the expected positions 102 of the holes 101 planned to be opened in the insulating rod 100. The thermosetting resin as the matrix resin is impregnated into the aggregate 5 similarly to Embodiment 1, and then heat cured. By removing the heat-cured woven-cloth glass fiber reinforced composite material 1 according to Embodiment 6 from the core metal 4, the series of production processes is finished.

FIG. 14 is the insulating rod 100 formed using the woven-cloth glass fiber reinforced composite material 1 according to Embodiment 6 of the present invention. Protection layers 12a of the organic fiber reinforced plastics are formed on both the inside and outside of the insulating rod 100, and especially, protection layers 12b by which the thickness of the outside both end portions (specific portions) is increased are formed. In the specific portions on which the protection layers 12b are formed, the holes 101 to be opened using the electric drill or the like for connecting to another part which is not illustrated, or the expected positions 102 at which the holes are opened are marked thereon.

The specific portions at which the protection layers 12b having large thickness are formed have the strong mechanical strength comparing to that of the other portions having the thin protection layers 12a. The thick protection layers 12b using the expensive p-aramid fiber or polyarylate fiber are not used all over the entire insulating rod 100; therefore, an effect is obtained that its production cost can be reduced more than that in a case of the thick protection layers 12b being provided over the entire insulating rod 100. Here, because the specific portions on which the thick protection layers 12b are provided are designed by a manufacturer, it is needless to be especially determined portions. That is, the part produced by using the woven-cloth glass fiber reinforced composite material 1 is configured in such a way that the protection layers 12b are formed at some portions thereof. In other words, the thickness of the protection layers 12 provided on the surfaces of the GFRP is configured to be different depending on portions thereof. Accordingly, the gas insulated apparatus, according to Embodiment 6 of the present invention, in which such protection layers having different thickness are formed is obvious to be a part having higher hydrogen-fluoride-gas resistance comparing to that of the conventional part having no protection layers.

EXPLANATION OF REFERENCES

1: Woven-cloth glass fiber reinforced composite material
2: p-Aramid fiber woven cloth (Organic fiber woven cloth)
3: Glass woven cloth
9: Matrix resin
11: Glass fiber reinforced plastics (GFRP)
12: Protection layer (Organic fiber reinforced plastics)
13: Fixing layer
14: Matrix-resin layer

What is claimed is:
1. A gas insulated apparatus comprising:
a sealed container in which a high-voltage conductor, sulfur hexafluoride for insulating the high-voltage conductor, and a part contacting said sulfur hexafluoride are included,
the part being formed from organic fiber woven cloth formed by providing a protection layer on a surface of glass fiber reinforced plastics and by wrapping the protection layer around the glass fiber reinforced plastics, and from thermosetting resin impregnated into weave patterns of the organic fiber woven cloth and then heat cured.
2. A gas insulated apparatus as recited in claim 1, further comprising:
a fixing layer being provided on the surface of the protection layer, wherein the fixing layer being formed from thermosetting resin impregnated into cloth provided on the protection layer and then heat cured.
3. A gas insulated apparatus as recited in claim 1, further comprising:
a matrix-resin layer being provided on the surface of the protection layer, wherein the matrix-resin layer being formed of the same thermosetting resin as matrix resin used for the glass fiber reinforced plastics.
4. A gas insulated apparatus as recited in claim 1, further comprising:
a fixing layer being provided on the surface of the protection layer, wherein the fixing layer being formed from polyester cloth wrapped around the protection layer and from thermosetting resin impregnated into the polyester cloth and then heat cured.

5. A gas insulated apparatus as recited in claim 1, wherein the organic fiber woven cloth is either aramid fiber woven cloth or polyarylate fiber woven cloth.

6. A gas insulated apparatus as recited in claim 1, wherein the thermosetting resin is any one of epoxy resin, phenol resin, and polyester resin.

7. A gas insulated apparatus as recited in claim 4, wherein the polyester cloth is any one of poly(butylene naphthalate) nonwoven cloth, poly(etylene terephthalate) nonwoven cloth, poly(trimethylene terephthalate) nonwoven cloth, poly(butylene terephthalate) nonwoven cloth, and poly(ethylene naphthalate) nonwoven cloth.

8. A gas insulated apparatus as recited in claim 1, wherein the protection layer is provided at a portion on the surface of the glass fiber reinforced plastics forming the part.

9. A gas insulated apparatus as recited in claim 1, wherein the thickness of the protection layer provided on the surface of the glass fiber reinforced plastics is different depending on a portion thereat.

10. A gas insulated apparatus comprising:
   a sealed container in which sulfur hexafluoride for insulating an electrical contact, and a part contacting said sulfur hexafluoride are included,
   the part being formed from organic fiber woven cloth formed by providing a protection layer on a surface of glass fiber reinforced plastics and by providing the protection layer on the glass fiber reinforced plastics, and from thermosetting resin impregnated into weave patterns of the organic fiber woven cloth and then heat cured.

11. A gas insulated apparatus as recited in claim 10, further comprising:
   a fixing layer being provided on the surface of the protection layer, wherein the fixing layer being formed from thermosetting resin impregnated into cloth provided on the protection layer and then heat cured.

12. A gas insulated apparatus as recited in claim 10, further comprising:
   a matrix-resin layer being provided on the surface of the protection layer, wherein the matrix-resin layer being formed of the same thermosetting resin as matrix resin used for the glass fiber reinforced plastics.

13. A gas insulated apparatus as recited in claim 10, further comprising:
   a fixing layer being provided on the surface of the protection layer, wherein the fixing layer being formed from polyester cloth provided on the protection layer and from thermosetting resin impregnated into the polyester cloth and then heat cured.

14. A gas insulated apparatus as recited in claim 6, wherein the thermosetting resin is the same as matrix resin used for the glass fiber reinforced plastics.

15. A gas insulated apparatus as recited in claim 10, wherein the organic fiber woven cloth is either aramid fiber woven cloth or polyarylate fiber woven cloth.

16. A gas insulated apparatus as recited in claim 10, wherein the thermosetting resin is any one of epoxy resin, phenol resin, and polyester resin.

17. A gas insulated apparatus as recited in claim 16, wherein the thermosetting resin is the same as matrix resin used for the glass fiber reinforced plastics.

18. A gas insulated apparatus as recited in claim 13, wherein the polyester cloth is any one of poly(butylene naphthalate) nonwoven cloth, poly(etylene terephthalate) nonwoven cloth, poly(trimethylene terephthalate) nonwoven cloth, poly(butylene terephthalate) nonwoven cloth, and poly(ethylene naphthalate) nonwoven cloth.

19. A gas insulated apparatus as recited in claim 10, wherein the protection layer is provided at a portion on the surface of the glass fiber reinforced plastics forming the part.

20. A gas insulated apparatus as recited in claim 10, wherein the thickness of the protection layer provided on the surface of the glass fiber reinforced plastics is different depending on a portion thereat.

* * * * *